United States Patent Office 3,718,715
Patented Feb. 27, 1973

3,718,715
BLENDS OF THERMOPLASTIC COPOLYESTER ELASTOMERS WITH VINYL CHLORIDE POLYMERS
Robert W. Crawford and William K. Witsiepe, Wilmington, Del., assignors to E. I. du Pont de Nemours and Company, Wilmington, Del.
No Drawing. Filed May 19, 1971, Ser. No. 145,062
Int. Cl. C08g 39/10
U.E. Cl. 260—873
14 Claims

ABSTRACT OF THE DISCLOSURE

A uniform blend of about 5–95% by weight vinyl chloride polymer having a tensile modulus of at least about 50,000 p.s.i. and about 95–5% by weight of at least one thermoplastic segmented copolyester polymer containing (1) about 5–90 weight percent long chain ester units derived from at least one long chain glycol having a molecular weight of about 600–6000 and at least one low molecular weight dicarboxylic acid having a molecular weight less than about 300, and (2) about 10–95 weight percent short chain ester units derived from at least one low molecular weight diol having a molecular weight of less than about 250 and at least one low molecular weight dicarboxylic acid having a molecular weight of less than about 300. These blends exhibit excellent abrasion resistance which is maintained even in the presence of a large amount of plasticizer, improved low temperature flexibility, impact resistance and increased scuff resistance. These blends also exhibit improved processing because of excellent thermal stability and low melt viscosity.

BACKGROUND OF THE INVENTION

Thermoplastic polymers of vinyl chloride are used for a variety of purposes such as pipes, tubing, hose, sheet, shoe soles, coated fabrics, wire covering, flooring, and weatherstripping. Because such thermoplastic polymers are generally brittle and exhibit poor elongation and abrasion properties, it has been common practice to add various modifiers such as thermoplastic polyurethanes, monomeric plasticizers, low molecular weight aliphatic polyesters, and nitrile rubber; however, blends containing such modifiers suffer a variety of disadvantages such as volatility, hydrolytic instability, poor abrasion resistance, susceptibility to fungus, processing difficulties, and poor low temperature properties. There has been a need for a modifier for thermoplastic polymers of vinyl chloride which imparts good abrasion resistance, impact resistance, fungus resistance, improved processability, good low temperature properties and improved hydrolytic stability to such modified compositions.

SUMMARY OF THE INVENTION

According to this invention there is provided a uniform blend of about 5–95% by weight vinyl chloride polymer (the term polymer includes vinyl chloride copolymer) having a tensile modulus of at least about 50,000 p.s.i. by ASTM D–638, and about 95–5% by weight of at least one thermoplastic segmented copolyester polymer comprising (1) 5–90 weight percent long chain ester units or segments derived from at least one long chain glycol having a molecular weight of about 600–6000 and at least one low molecular weight dicarboxylic acid having a molecular weight less than about 300, and (2) 10–95 weight percent short chain ester units derived from at least one low molecular weight diol having a molecular weight of less than about 250 and at least one low molecular weight dicarboxylic acid having a molecular weight of less than about 300.

The blends prepared in accordance with this invention are fungus resistant, exhibit a wide processing temperature range, have good low temperature properties, are nonvolatile, have good impact resistance, have exceptionally high abrasion resistance which is maintained even in the presence of large amounts of plasticizers or filler, and have improved hydrolytic stability. In addition blends which are rich in the copolyester polymer exhibit improved stiffness, scuff resistance and in many instances, improved tear strength. Relative to ploymeric plasticizers such as thermoplastic urethanes, the copolyesters of this inventon are more thermally stable, permitting a wider range of processing temperatures, do not stick to highly polished chrome-plated processing rolls, and permit use of higher shear (more efficient) mixing screws.

DETAILED DESCRIPTION

Generally the copolyesters useful in this invention are segmented copolyester polymers consisting essentially of recurring intralinear long chain ester units and short chain ester units randomly joined head-to-tail through ester linkages, said long chain ester units being represented by the formula

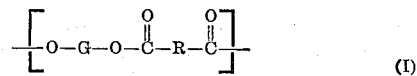
(I)

and said short chain ester units being represented by the formula

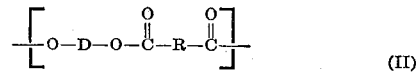
(II)

where G is a divalent radical remaining after the removal of terminal hydroxyl groups from at least one long chain glycol having a molecular weight of about 600–6000; R is a divalent radical remaining after removal of carboxyl groups from at least one dicarboxylic acid having a molecular weight less than about 300; and D is a divalent radical remaining after removal of hydroxyl groups from at least one low molecular weight diol having a molecular weight less than 250.

Copolyesters of the type described herein which have high melting points do not blend readily with polymers of vinyl chloride at safe processing temperatures for vinyl chloride polymers. Therefore copolyesters having melting points in excess of 215° C. are not preferred for use in the compositions of the present invention unless they are first pre-mixed with plasticizers so that mixing temperatures are reduced to an acceptable level for vinyl incorporation.

Segmented copolyester polymers useful for compositions of this inventioi are generally (guidelines for preparing polymers having desirably low melting points are given hereinafter) produced by reacting together in a mixture at least one long chain glycol, at least one low molecular weight diol, and at least one dicarboxylic acid. The long chain ester units are segments of the copolyester chain which are the reaction product of the long chain glycol and the dicarboxylic acid. The short chain ester units are segments of the copolyester chain which are the reaction product of the low molecular weight diol and the dicarboxylic acid. The reaction is conducted by conventional methods and conditions. The short chain ester units should be chosen so that a polymer made up solely of short chain ester units and having a molecular weight in the fiber-forming range (>5000), has a melting point of at least 150° C. The melting point is determined by extinction of polarized light observed while the sample is heated on a hot stage microscope substantially by the procedure described in "Preparative Methods of Polymer Chemistry," Sorenson and Campbell, Interscience Publishers, second edition, 1968, pages 53–55. The melting point is the average of the temperatures at which the first and last sample particles blend with the background while heating at 1° C./minute after first annealing the sample for 30 minutes at a temperature about 20° C. below the approximate melting point.

Generally, the long chain and the short chain units combine to form the copolyester polymer according to their tendencies to react under the conditions used. This order of combination can be termed random or statistical. The various ester units are combined in a head-to-tail arrangement through ester linkages forming a substantially intralinear polymer. The exact polymer chain configuration is not critical as long as the various reactant and proportion parameters are met.

Copolyester polymers which are particularly useful for compositions of this invention have 5–90 weight percent long chain ester units and at least 50 mole percent of the total short chain ester units of the same type, i.e., derived from one type of acid and one type of low molecular weight diol. Copolyesters having 30–65 weight percent long chain ester units are preferred. Such preferred copolyesters are described in U.S. Pat. 3,023,192 to Shivers.

Copolyester polymers useful for making the compositions of this invention can be conveniently made by conventional ester interchange reaction. A preferred procedure involves heating at about 150–260° C. the dimethyl ester of a dicarboxylic acid with a long chain glycol and a molar excess of a short chain diol in the presence of an ester interchange catalyst. Methanol formed by the interchange reaction is distilled off and heating is continued until methanol evolution is completed. The interchange reaction or polymerization is typically complete within a few minutes to a few hours depending upon the particular temperature, catalyst, glycol excess, and reactants used. This procedure produces a low molecular weight prepolymer which can be transformed into high molecular weight copolyester by additional ester interchange as described herein.

Low molecular weight prepolymer can be prepared by other ester interchange procedures. A long chain glycol can be reacted with a high or low molecular weight short chain ester homopolymer or copolymer in the presence of ester interchange catalyst until a random ester prepolymer is produced by the interchange reactions. Short chain ester homopolymer or copolymer can be prepared by ester interchange from either dimethyl esters and low molecular weight diols, as above, or from free acids with diol acetates. Short chain ester copolymer can be prepared by direct esterification of appropriate acids, anhydrides, or acid chlorides with diols or alternatively by reaction of the acids with cyclic ethers or carbonates. Ester prepolymer can also be prepared by using a long chain glycol in place of a diol or using a mixture of reactants.

Molecular weight of the ester prepolymer is increased by removing excess short chain diol by distilling it from the prepolymer. This operation is frequently referred to as "polycondensation." Additional ester interchange occurs during the distillation to increase the molecular weight and to further randomize the arrangement of the copolyester units. The distillation conditions typically are less than 5 mm. Hg, at 220–280° C. Antioxidants, such as sym-di-beta-naphthyl-p-phenylenediamine and 1,3,5-trimethyl - 2,4,6 - tris(3,5 - ditertiary-butyl-4-hydroxybenzyl)benzene can be added to reduce degradation.

To increase the rate of ester interchange catalysts can be employed for the prepolymer and polycondensation steps. Any one of a wide variety of well-known catalysts can be used, but organic titanates, such as tetrabutyl titanate either alone or combined with magnesium or zinc acetates, are preferred. Complex titanates derived from alkali or alkaline earth metal alkoxides and titanate esters are very effective. Inorganic titanates (such as lanthanum titanate), calcium acetate/antimony trioxide mixtures, and lithium and magnesium alkoxides are other catalysts which can be used. The polycondensation can also be accelerated by adding diaryl esters or carbonates as disclosed in U.S. Pat. 3,433,770 and 3,444,141, respectively, both to Teijin Limited.

Ester interchange polymerizations are generally run in a melt without added solvent, but inert solvent can be used to facilitate removal of volatile components from the mass at low temperatures. Other special processing techniques, such as azeotropic distillation using a solvent to prepare prepolymer and interfacial polymerization, can be used for specific polymers and problems. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Long chain glycols which can be used to produce the copolyester polymers useful for the compositions of this invention are substantially linear glycols having hydroxyl groups on the chain which are terminal, or as nearly terminal as possible, and having a molecular weight of above about 600 and preferably 600–6000.

A preferred group of long chain glycols have a melting point of less than about 60° C. and a carbon to oxygen ratio of at least about 2. These preferred glycols produce compositions having elastomeric character.

Long chain glycols which can be used to prepare copolyester polymers useful for the composition of this invention include poly(alkylene oxide)glycols wherein the alkylene group has 2–10 carbon atoms, such as poly(ethylene oxide)glycol,
poy(1,2- and 1,3-propylene oxide)glycol,
poly(tetramethylene oxide)glycol,
poly(pentamethylene oxide)glycol,
poly(hexamethylene oxide)glycol,
poly(heptamethylene oxide)glycol,
poly(octamethylene oxide)glycol,
poly(nonamethylene oxide)glycol, and
poly(1,2-butylene oxide)glycol;

random or block copolymers of ethylene oxide and 1,2-propylene oxide, and poly-formals prepared by reacting formaldehyde with glycols, such as propylene glycol, or mixtures of glycols, such as a mixture of tetramethylene and pentamethylene glycols.

Long chain glycols can also be formed in situ from dicarboxymethyl acids of poly(alkylene oxides) such as

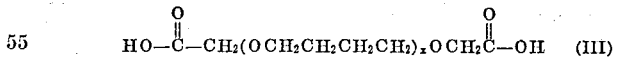

$$HO-\overset{O}{\underset{\|}{C}}-CH_2(OCH_2CH_2CH_2CH_2)_xOCH_2\overset{O}{\underset{\|}{C}}-OH \quad (III)$$

derived from polytetramethylene oxide. When the long chain dicarboxylic acids (III above) are added to the polymerization mixture as acids, they react with the low molecular weight diol or diols present in excess to form the corresponding poly(alkylene oxide)ester glycols. The dicarboxylic acids can also react with long chain glycols which are present, in which case diol units (D) in the polymer chain are polymeric residues of the long chain glycols. However, this second reaction occurs only to a very limited degree because the low molecular weight diol is present in considerable molar excess.

Polythioether glycols and polyester glycols can also be used as the glycols for producing copolyester polymers for the compositions of this invention. With polyester glycols care must generally be exercised to reduce tendency of such glycols to interchange during polymerization. Either polybutadiene or polyisoprene glycols, copolymers of these, and saturated hydrogenation products of these materials can be used as long chain glycols herein. Glycol esters of dicarboxylic acids formed by oxidation of polyisobutylene diene copolymers can also be used as glycols for the copolyester polymers useful for compositions of this invention.

Poly(tetramethylene oxide)glycol, poly(1,2-propylene oxide)glycol, poly(ethylene oxide)glycol and poly(1,2-propylene oxide)glycol capped with ethylene oxide units are preferred long chain glycols.

Dicarboxylic acids which can be used to produce the copolyester polymer useful for compositions of this invention are aliphatic, cycloaliphatic, or aromatic dicarboxylic acids of a low molecular weight, i.e., having a molecular weight of less than about 300. Dicarboxylic acids, as used herein, include acid equivalents having two functional carboxyl groups which perform substantially like dicarboxylic acids in reaction with glycols and diols forming copolyester polymers. These equivalents include esters, ester-forming derivatives, such as acid halides and anhydrides, and other derivatives which behave substantially like dicarboxylic acids forming esters with glycols and diols. The molecular weight requirement pertains to the acid and not to its equivalent, ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the thermoplastic compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation cannot be used because such acids do not satisfactorily form the copolyester polymers necessary for the compositions of this invention, but acids having unsaturation which is not conjugated can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylenebis(cyclohexyl carboxylic acid), 3,4-furan dicarboxylic acid, and 1,1-cyclobutane dicarboxylic acid. Preferred can be used for this invention are sebacic acid, 1,3-cycloaliphatic acids are cyclohexanedicarboxylic acids and adipic acid.

Representative aromatic dicarboxylic acids which can be used include phthalic, terephthalic, and isophthalic acids, bibenzoic acid, substituted dicarboxy compounds with two benzene nuclei such as bis(p-carboxyphenyl) methane, p-oxy(p-carboxyphenyl) benzoic acid, ethylenebis(p-oxybenzoic acid), 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid, $C_1$–$C_{12}$ alkyl and ring substitution derivatives thereof, such as halo, alkoxy, and aryl derivatives. Hydroxyl acids such as p(beta-hydroxyethoxy) benzoic acid can also be used providing an aromatic dicarboxylic acid is also present.

Aromatic dicarboxylic acids are a preferred class for preparing the copolyester polymers useful for compositions of this invention because these elastomeric polymers inherently have good hydrolytic stability. Among these aromatic acids those with 8–16 carbon atoms are preferred, particularly the phenylene dicarboxylic acids, i.e., phthalic, terephthalic, and isophthalic acids.

Low molecular weight diols which can be used to produce copolyester polymers useful in the compositions of this invention are aliphatic, cycloaliphatic, and aromatic diols having a molecular weight of less than about 250 and two functional hydroxyl groups. Diol equivalents which form esters with dicarboxylic acids are included and the molecular weight requirement applies only to the diol and not to its equivalent. Such equivalents are illustrated by ethylene oxide and ethylene carbonate which can be used in the place of ethylene glycol.

The terms "aliphatic," "cycloaliphatic," and "aromatic" as used to define the diols useful for this invention have the same general meaning as applied to the dicarboxylic acids and glycols set forth herein with the location of the functional hydroxyl groups being the determining factor similar to the location of the carboxyl groups for the dicarboxylic acids.

Preferred low molecular weight diols useful for preparing compositions of this invention include diols having 2–15 carbon atoms such as ethylene, 1,2- or 1,3-propylene, isobutylene, tetramethylene, pentamethylene, 2,2-dimethyltrimethylene, hexamethylene, and decamethylene glycols, dihydroxy cyclohexane, cyclohexane dimethanol, hydroquinone-bis(beta-hydroxyethyl)ether resorcinol, hydroquinone, 1,5-dihydroxy naphthalene, etc. Especially preferred are aliphatic diols containing 2–8 carbon atoms. Bis-phenols, such as bis(p-hydroxy) diphenyl, bis(p-hydroxyphenyl)methane and bis(p-hydroxyphenyl)propane can be used.

An especially preferred group of copolyesters are those based on terephthalic acid, butanediol-1,4, and poly(tetramethylene oxide)glycol; optionally, containing phthalic acid and/or isophthalic acid as needed to reduce the melting point of the copolyester to the desired level.

As previously indicated, it is desirable to employ segmented copolyesters in this invention which have melting points below about 215° C. The general relationship between monomer mole fraction and polymer melting point is discussed by Flory, Principles of Polymer Chemistry, page 570, Cornell University Press, 1953. He has suggested that the copolymer melting point ($T_m$) depends upon homopolymers melting point ($T_m°$), homopolymer mole fraction ($N_A$), homopolymer heat of fusion ($\Delta H\mu$) and the gas constant (R) in the following way:

$$1/T_m - 1/T_m° = -(R/\Delta H\mu)1_n N_A$$

This equation is roughly valid for the class of copolyesters employed in the blends of this invention. For copolyesters in which the major short chain ester units are 1,4-butylene terephthalate units, $T_m° \cong 234°$ C. and $\Delta H\mu \cong 12.1$ cal./g. To prepare copolyesters having melting points below about 215° C., it can be calculated that the mole fraction of 1,4-butylene terephthalate units must be less than about 0.90. The calculated value is supported by the observed melting points of a number of copolyesters based on 1,4-butylene terephthalate units. In a similar manner, it has been found that copolyesters based on ethylene terephthalate units should have a mole fraction of ethylene terephthalate units not greater than about 0.85 to obtain copolyesters melting below about 215° C.

The vinyl chloride polymers useful in this invention include homopolymers and copolymers having a tensile modulus of at least about 50,000 p.s.i. in the absence of agents such as flexibilizers or plasticizers. Tensile modulus is measured by ASTM D-638.

The copolymers which are useful include those containing up to about 30% by weight of units from interpolymerizable comonomers such as vinyl acetate, vinyl stearate, vinylidene chloride, acrylonitrile, acrylate and methacrylate esters, dibutyl formate, and diethyl maleates.

Vinyl chloride polymers which are preferred for use in the present invention include vinyl chloride homopolymers and copolymers with vinyl acetate and vinylidene chloride.

The blends of the present invention contain about 5–95% by weight of the copolyester based on the total weight of the copolyester and vinyl chloride polymer (excluding the weight of conventional additives, plasticizers and processing aids which may, of course, be employed with the blends of the present invention). Blends of rigid vinyl chloride polymers containing 5–25% copolyester are preferred for improving the impact resistance and processing characteristics of rigid vinyls. Blends containing about 10–50% of copolyester are preferred for improving the properties of plasticized vinyl chloride polymers. Such blends exhibit improved abrasion resistance and load bearing characteristics and are useful as heel lifts. Blends of 30 to 60 copolyester with unplasticized vinyl chloride polymer resins wherein the copolyester functions as a plasticizer for the vinyl chloride polymer are particularly useful for upholstery, interior automotive applications, food packaging film, wall covering, flooring, wire and cable coatings and the like. These blends have good low temperature flexibility and are useful at elevated temperatures. The copolyester is permanent in these blends and resists extraction, migration and aging. Blends containing about 60 to 90% copolyester are preferred for stiffening and improving the scuff-resistance and in some instances the tear strength of the copolyesters while maintaining useful abrasion resistance. The blends rich in copolyester are economical for use in shoe soling, molded tires wire coatings and coated fabrics.

For best results, in preparing the blends of this invention, the components must be thoroughly and uniformly blended, otherwise localized areas will differ in properties. The compositions may be prepared by heating the components to a temperature sufficient to soften them and agitating until a uniform blend is formed. The temperature required to soften or melt components depends on the particular copolyester and vinyl chloride polymer, but generally will be in the range of 150–215° C. Generally, it is preferred to use the lowest temperature which will permit the mixing means available to be effective. If desired, solvents or plasticizers can be used to assist in mixing the copolyester with the vinyl chloride polymer at lower temperatures or to lower the mixing temperature of copolyesters melting above about 215° C. Suitable mixing devices include heated rubber mills, internal mixers (Banbury mixer) and twin barrel extruders, or single screw extruders fitted with mixing attached to the screw. A particularly convenient procedure for preparing the compositions consists of dry blending a fine powder of the vinyl chloride polymer with a fine powder of the copolyester and incorporating the vinyl chloride polymer into the copolyester in the barrel of an extruder or injection molding machine at the time the copolyester is being used to prepare extruded or molded goods. The vinyl chloride polymer may also be conveniently added to the molten copolyester immediately following completion of the polycondensation step in copolyester preparation. Blends can also be prepared by mixing vinyl latexes or powder dispersions with dispersions of copolyester. Such mixtures can be employed in processes normally used for vinyl latices or dispersions. To obtain the maximum improvement in properties, fluxing of the mixture during processing is usually required.

Extrusion of such blends as described herein also reveals advantages over the use of polymeric plasticizers such as thermoplastic urethanes. Firstly, the excellent melt stability of the segmented copolyesters permits the use of a broader range of extrusion temperatures. Second, the extruded blend has little tendency to stick to highly polished chrome-plated sheeting and calender rolls. (Thermoplastic urethanes are known to stick badly to highly polished surfaces.) Thirdly, at the higher levels of segmented copolyester (ca. 50–95%), the excellent melt stability and low melt viscosity permits the use of extrusion screws of higher compression ratio, permitting higher screw speeds and output rates without an undesirable increase in melt temperature.

In addition to these processing advantages, property advantages such as improved abrasion resistance, impact strength and low temperature properties are provided by the present blends as previously indicated.

The blends of this invention to be processed by substantially all procedures which have been used for thermoplastics in general and, in many instances, they offer significant processing advantage over competitive thermoplastic materials. The blends can be injection, compression, transfer and blow molded to form elastic molded articles (such as tires), which may include inserts, if desired, meeting close tolerances. They can be readily extruded to produce films (blown or unblown), tubing, other forms having complicated cross sections, and cross-head extruded for hose, wire, cable and other substrate covers. They can be readily calendered to produce films and sheeting or to produce calender-coat woven and nonwoven fabrics and other substances.

In finely divided form, the blends of this invention offer advantages for procedures employing powdered thermoplastics. In addition, they can be used in crumb form. The flow characteristics of these blends facilitate fusion bonding procedures such as rotational molding (either one or two axis methods), slush molding, and centrifugal molding as well as powder coating techniques such as fluidized bed, electrostatic spray, flame spray, flock coating, powder flow coating, cloud chamber and heat fused coating (for flexible substrates). Plastisols made from mixed vinyl-copolyester powder dispersions are useful for surface coatings, coated fabrics and foams.

The characteristics of these blends offer advantages for use in certain coating and adhesive procedures such as dip, transfer, roller and knife coating and hot melt adhesives. These same advantages are useful in various combining and laminating operations such as hot roll, web and flame laminating as well as other thermoplastic heat sealing processes.

All parts, proportions and percentages disclosed herein are by weight unless otherwise indicated. The following examples further illustrate the invention.

Examples

Copolyester A is prepared by ester interchange of 4.53 moles of dimethyl terephthalate hereinafter (DMT), 1.27 moles of dimethyl isophthalate hereinafter (DMI), 1.0 mole of polytetramethyleneether glycol hereinafter (PTMEG-980) (having a number average molecular weight about 980) and excess 1,4-butanediol in the presence of a tetrabutyl titanate/magnesium acetate catalyst and a stabilizer [sym-di-beta-naphthyl-phenylene diamine or 1,3,5 - trimethyl - 2,4,6-tri(3,5-di-tert-butyl-4-hydroxybenzyl)benzene]. Ester interchange is conducted at atmospheric pressure up to a final temperature of 220° C. The ester interchange is followed by polycondensation at 250° C. at about one torr for about 90 minutes. At higher pressures a product having a lower inherent viscosity will be produced but a higher rate of production will be obtained. Conveniently pressures of less than about 5 torr are employed. The resulting polymer has an inherent viscosity of about 1.45–1.55.

Copolyester B is prepared by ester interchange of 3.5 moles of DMT, 1 mole PTMEG-980 and excess 1,4-butanediol using the ester interchange and polycondensation conditions and catalyst and stabilizer described for the preparation of Copolyester A. Copolyester B has an inherent viscosity of about 1.5.

Copolyester C is prepared by ester interchange of 7.85 moles of DMT, 1 mole PTMEG-980 and excess 1,4-butanediol using the ester interchange and polycondensation conditions and catalyst described for the preparation of Copolyester A. Copolyester C has an inherent viscosity of about 1.45.

Inherent viscosities of the copolyesters described hereinbefore are measured at 30° C. at a concentration of 0.5 g./dcl. in a mixed solvent of 60 parts liquid phenol (90% phenol; 10% water) and 40 parts of 1,1,2-trichloroethane.

The following ASTM methods are employed in determining the properties of the polymers prepared in the examples which follow.

Modulus at 100% elongation, $M_{100}$ _____ D412
Modulus at 300% elongation, $M_{300}$ _____ D412
Tensile at break, $T_B$ _____ D412
Elongation at break, percent _____ D412
Tear strength _____ D470
Hardness, Shore D _____ D1484
NBS Abrasion Index _____ D1630
Izod Import, notched _____ D256

EXAMPLE 1

Four polymer blends are prepared having the composition and properties set forth in Table I. For comparison, properties of the polymers contained in the blends are included in the table. Blends containing Copolyester A are prepared by milling on a heated rubber mill for 10 minutes at about 165° C. Blends containing Copolyester C are prepared in the same manner with the mill at 185° C. Slabs (0.075" thickness) for determining physical properties were prepared by compression molding at temperatures approximating those required for milling.

TABLE I

| Polymer blend or control | 1-A | 1-B | 1-C | 1-D | 1-E | 1-F | 1-G |
|---|---|---|---|---|---|---|---|
| Component: | | | | | | | |
| Vinyl chloride homopolymer [1] | | 67 | 50 | 100 | 67 | 50 | |
| Copolyester: | | | | | | | |
| A | 100 | 33 | 50 | | | | |
| C | | | | | 33 | 50 | 100 |
| Properties: | | | | | | | |
| Tensile strength, p.s.i. | 5,900 | 5,110 | 5,165 | 8,200 | 5,400 | 5,075 | 6,275 |
| Elongation at break, percent | 805 | 290 | 370 | 35 | 250 | 335 | 730 |
| Modulus, 100%, p.s.i. | 925 | 2,600 | 1,755 | | 3,080 | 2,315 | 2,250 |
| NBS abrasion index | 800 | 522 | 410 | 275 | 1,275 | 1,275 | 3,540 |
| Hardness, Shore D | 40 | 72 | 57 | 83 | 73 | 70 | 55 |

[1] The vinyl chloride homopolymer is a rigid polyvinyl chloride compounded with lubricants, stabilizers and pigments. It has a specific gravity of 1.40 and a tensile modulus of 300,000 p.s.i. The material is sold as Geon 82662 by F. B. Goodrich Chemical Company.

Addition of the copolyesters to the vinyl chloride homopolymer confer elastomeric character to the vinyl chloride homopolymer as indicated by large increases in elongation at break. At the same time, the abrasion resistance of the vinyl is increased markedly.

EXAMPLE 2

Ten parts of Copolyester A is blended with 100 parts of a rigid vinyl chloride homopolymer (specific gravity 1.4; inherent viscosity by ASTM D-1243-60, Method A, 1.11, tensile modulus 300,000 p.s.i.) and 3 parts of dibutyl tin dilauryl mercaptide stabilizer by mixing for 10 minutes at about 165° C. on a rubber mill. The blend has a notched Izod impact, notched of 1.9 lbs./in. compared to 0.4 lb./in. for the straight rigid vinyl chloride homopolymer.

When the rigid vinyl chloride homopolymer is replaced by a vinyl chloride (86%)/vinyl acetate (14%) copolymer having a tensile modulus of 130,000 p.s.i. The Izod impact, notched, is 2.6 lbs./in. compared to a value of 0.7 lb./in. for the straight copolymer.

The Izod impact strength of these blends at 140° F. is at least twice as great as the strength of the corresponding straight vinyl chloride polymers. The britte point of the blends is also lower than that of the straight vinyl chloride polymers. The Shore D hardness of these blends is substantially the same as the hardness of the unblended vinyl chloride polymers.

EXAMPLE 3

A blend of 8 parts of the vinyl chloride homopolymer used in Example 1, 4 parts of Copolyester A and 3 parts of dioctyl phthalate is prepared by milling at 155–165° C. The NBS Abrasion Index of this blend is 960. The blend contains 20% plasticizer. A blend of 4 parts of the vinyl chloride homopolymer and 1 part of dioctyl phthalate has an NBS Abrasion Index of only 515.

EXAMPLE 4

A blend of 10 parts of a vinyl chloride (86%)/vinyl acetate (14%) copolymer having a specific gravity of 1.36 and a tensile modulus of 150,000 p.s.i., 100 parts of Copolyester B and 3 parts of a mixed triaryl phosphite stabilizer (Wytax 312, sold by National Polychemicals, Inc., Wilmington, Mass.) is prepared by milling for 10 minutes at about 165° C. on a rubber mill. The resulting blend is optically clear and transparent. Copolyester B in the absence of the vinyl copolymer is so cloudy as to be nearly opaque in the form of an 0.075 inch thick sheet.

The blend has the following physical properties:

Modulus, 100%, p.s.i. _____ 1060
Modulus, 300%, p.s.i. _____ 1350
Elongation at break, percent _____ 800
Tensile strength _____ 2200
Trouser tear, p.l.i. _____ 145

The scuff resistance of the blend is substantially better than that of the straight Copolyester B as indicated by the amount of material removed and the chatter marks formed when a knife edge is drawn over sheets of the blend and the control copolyester.

We claim:

1. A uniform blend of about 5–95% by weight vinyl chloride polymer having a tensile modulus of at least about 50,000 p.s.i. and about 95–5% by weight of at least one thermoplastic segmented copolyester polymer containing (1) about 5–90 weight percent long chain ester units derived from at least one long chain glycol having a molecular weight of about 600–6000 and having a melting point of less than about 60° C. and a carbon-to-oxygen ratio of at least about 2 and at least one low molecular weight dicarboxylic acid having a molecular weight less than about 300 and (2) about 10–95 weight percent short chain ester units derived from at least one low molecular weight diol having a molecular weight of less than about 250 and at least one low molecular weight dicarboxylic acid having a molecular weight of less than about 300, said long chain ester units and short chain ester units randomly joined head-to-tail through ester linkages, said long chain ester units being represented by the formula

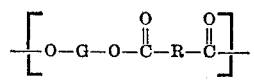

and said short chain ester units being represented by the formula

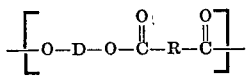

where G is a divalent radical remaining after the removal of terminal hydroxyl groups from said long chain glycol; R is a divalent radical remaining after removal of carboxyl groups from said dicarboxylic acid; and D is a divalent radical remaining after removal of hydroxyl from said low molecular weight diol.

2. The blend of claim 1 wherein the copolyester has a melting point of less than about 215° C.

3. The blend of claim 1 wherein the copolyester has 30–65 weight percent long chain ester units.

4. The blend of claim 1 wherein the long chain glycols are selected from the group consisting of poly(tetramethylene oxide)glycol, poly(1,2-propylene oxide)glycol, poly(ethylene oxide)glycol and poly(1,2 - propylene oxide)glycol capped with ethylene oxide units.

5. The blends of claim 1 wherein the low molecular weight dicarboxylic acids are aromatic dicarboxylic acids containing 8–16 carbon atoms.

6. The blends of claim 1 wherein the low molecular weight diols are aliphatic diols containing 2–8 carbon atoms.

7. The blends of claim 1 wherein the vinyl chloride polymer is a vinyl chloride homopolymer or copolymer containing up to about 30% by weight of units from vinyl acetate or vinylidene chloride.

8. The blends of claim 1 containing 5–25% copolyester.

9. The blends of claim 1 containing about 10–50% copolyester.

10. The blends of claim 1 containing 30–60% copolyester.

11. The blends of claim 1 containing about 60–90% copolyester.

12. The blend of claim 1 wherein the copolyester is prepared by ester interchange of about 4.5 moles dimethyl terephthalate, 1.3 moles dimethyl isophthalate, 1 mole polytetramethylene glycol having a number average molecular weight of about 980, and excess 1,4-butanediol in the presence of a catalyst and a stabilizer and polycondensation of the resulting reaction product at about 250° C.

13. The blend of claim 1 wherein the copolyester is prepared by ester interchange of about 3.5 moles dimethyl terephthalate, 1 mole polytetramethyleneether glycol having a number average molecular weight of about 980, and excess 1,4-butanediol in the presence of a catalyst and a stabilizer and polycondensation of the resulting reaction product at about 250° C.

14. The blend of claim 1 wherein the copolyester is prepared by ester interchange of about 7.9 moles dimethyl terephthalate, about 1 mole polytetramethyleneether glycol having a number average molecular weight of about 980, and excess 1,4-butanediol in the presence of a catalyst and a stabilizer and polycondensation of the resulting reaction product at about 250° C.

References Cited

UNITED STATES PATENTS

| | | | |
|---|---|---|---|
| 3,651,014 | 3/1972 | Witsiepe | 260—873 |
| 3,501,554 | 3/1970 | Aylesworth | 260—873 |

WILLIAM H. SHORT, Primary Examiner

E. WOODBERRY, Assistant Examiner